(12) United States Patent
Sprenger (10) Patent No.: US 9,560,326 B2
(45) Date of Patent: Jan. 31, 2017

(54) TECHNOLOGIES FOR PROJECTING A PROPORTIONALLY CORRECTED IMAGE

(71) Applicant: Intel Corporation, Santa Clara, CA (US)

(72) Inventor: Mark E. Sprenger, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/750,927

(22) Filed: Jun. 25, 2015

(65) Prior Publication Data

US 2016/0381331 A1    Dec. 29, 2016

(51) Int. Cl.
*H04N 9/31*         (2006.01)

(52) U.S. Cl.
CPC ................... *H04N 9/3179* (2013.01)

(58) Field of Classification Search
USPC .................................................. 348/745, 744
See application file for complete search history.

(56) References Cited

U.S. PATENT DOCUMENTS

| 6,830,185 | B2* | 12/2004 | Tsikos | G02B 26/10 |
|---|---|---|---|---|
| | | | | 235/462.01 |
| 2003/0142285 | A1* | 7/2003 | Enomoto | G06K 9/0061 |
| | | | | 355/77 |
| 2008/0024463 | A1* | 1/2008 | Pryor | B60K 35/00 |
| | | | | 345/175 |
| 2008/0278686 | A1* | 11/2008 | Kasper | A61B 3/14 |
| | | | | 351/207 |
| 2010/0141954 | A1* | 6/2010 | Kobayashi | G01B 9/02007 |
| | | | | 356/479 |
| 2011/0134436 | A1* | 6/2011 | Podoleanu | A61B 3/1015 |
| | | | | 356/512 |
| 2011/0299728 | A1* | 12/2011 | Markovic | G06T 7/0042 |
| | | | | 382/103 |
| 2014/0104387 | A1* | 4/2014 | Klusza | H04N 13/0207 |
| | | | | 348/46 |
| 2015/0342697 | A1* | 12/2015 | Saur | G02B 21/0012 |
| | | | | 359/381 |
| 2015/0342698 | A1* | 12/2015 | Eslami | A61F 9/00727 |
| | | | | 606/130 |

* cited by examiner

*Primary Examiner* — Paulos M Natnael
(74) *Attorney, Agent, or Firm* — Barnes & Thornburg LLP (57) ABSTRACT

Technologies for projecting a proportionally corrected image include a projection device. The projection device includes a camera capable of performing a depth scan and a projector capable of projecting an image onto a projection region of a projection surface. The projection device is configured to determine one or more image corrections as a function of the model of the projection region, transform the image based on the image corrections to generate an updated image, and project, by the projector, the updated image to the projection region. The projection device is further configured to monitor the projection region to detect an adjustment event, (i.e., a detected change of the projection region relative to the projection device) and generate, in response to detecting the adjustment event, another updated image based on the detected change of the projection region. Other embodiments are described and claimed.

25 Claims, 6 Drawing Sheets

TECHNOLOGIES FOR PROJECTING A PROPORTIONALLY CORRECTED IMAGE

BACKGROUND

Traditionally, artists have relied on various mechanical devices (e.g., calibers) and manual methods (e.g., using circles or a head size of a body to proportionally compare each part of the body) to measure and/or compare proportions of their artwork. Alternatively, some artists have relied upon projectors to project an image onto a surface on which the artist intends to work. Such techniques are generally employed when an artist wants to take a small image and paint a larger version of the small image onto a surface larger than that small image, typically of a much greater magnitude of size. Accordingly, a projector may be used to project the small image onto a larger surface, such as by projecting a scaled, larger image of the small image onto the larger surface. However, such projectors (e.g., overhead projectors, digital projectors, etc.) are typically used to project the image onto a flat surface, such as a wall, generally at a perpendicular angle. However, under certain conditions, the image may be projected onto a surface that is not flat (e.g., curved, angled, etc.). Additionally, the image may be projected onto the surface at a non-perpendicular angle relative to the projector, which may result in keystoning.

Accordingly, some projectors are configured to compensate for such surfaces, such as by applying a keystone correction (i.e., skewing the image), which results in a rectangular image being projected, often at the expense of the quality of resolution of the image being projected. Presently, two methods of keystone correction can be implemented: manual and digital. Manual keystone correction is generally accomplished by making a physical adjustment of the lens of the projection; however, manual keystone correction typically cannot eliminate horizontal keystoning. Digital keystone correction is generally accomplished by scaling or otherwise altering the image prior to the image being sent to the lens for projection; however, digital keystone correction results in a squared image, even at an angle.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C): (A and B); (A and C); (B and C); or (A, B, and C). Similarly, items listed in the form of "at least one of A, B, or C" can mean (A); (B); (C): (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
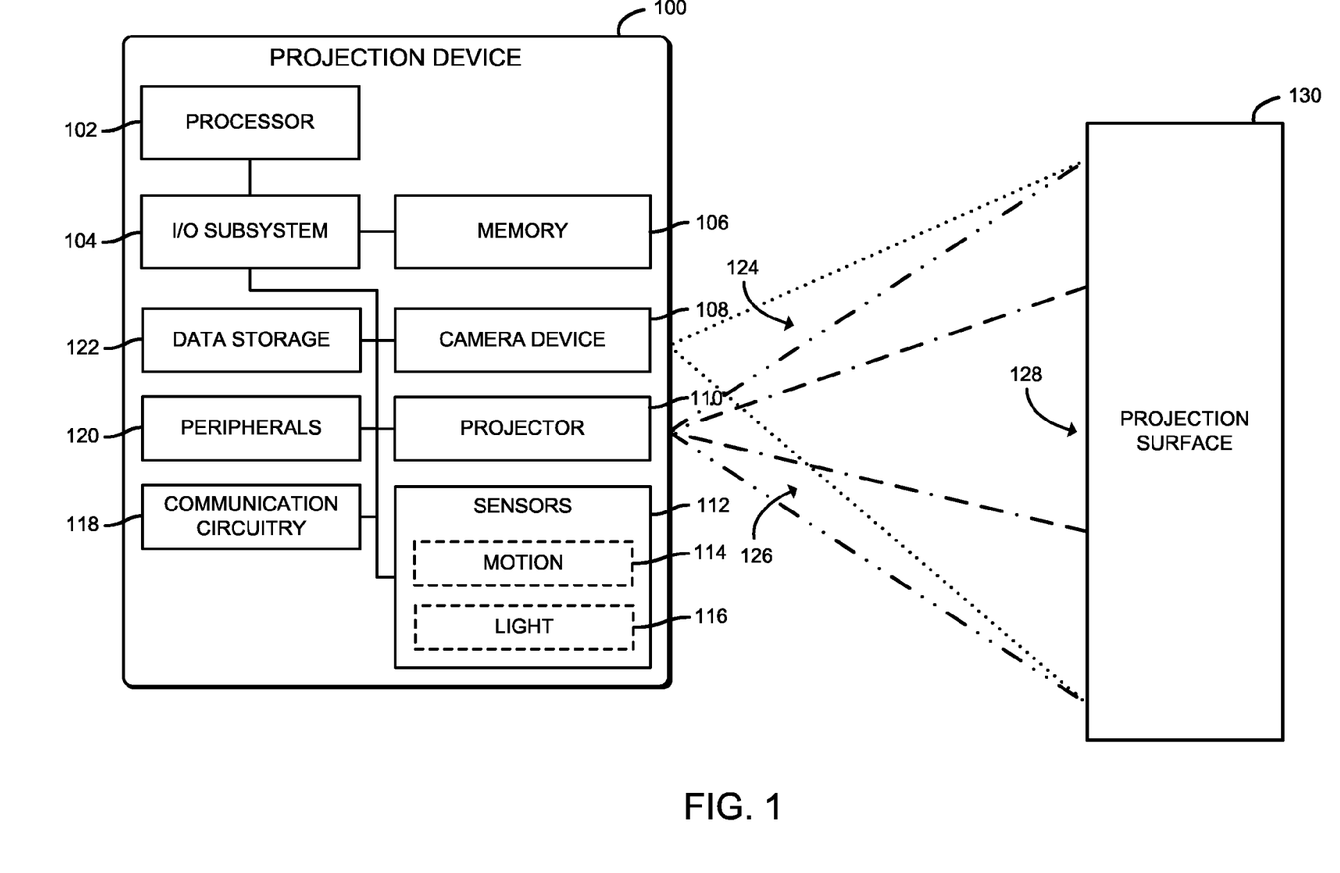
FIG. 1 is a simplified block diagram of at least one embodiment of a projection device for projecting an image that includes a camera and a projector.

Referring now to FIG. 1, in an illustrative embodiment, a projection device 100 for projecting an image includes a camera device 108 and a projector 110. In use, the projection device 100 projects an image (e.g., the image 502 of FIG. 5), via the projector 110, onto a projection region 128 of a projection surface 130. The projection device 100 is configured to detect various adjustment events, described in further detail below, such as modifications to the projection surface 130, movements of the projection device 100 relative to the projection surface 130, and/or movements of the projection surface 130 relative to the projection device 100.

For example, the projection surface 130 may be manipulated by an artist in the act of transforming the projection surface 130 into a work of art (e.g., a sculpture made of clay or other workable medium). In other words, one or more portions of the projection surface 130 may change over time, as the artist modifies the projection surface 130 into a piece of artwork, for example. Additionally or alternatively, the projection device 100 may be moved relative to the projection surface 130, such as when the artist moves the projection device 100 around the projection surface 130 while creating a 3-dimensional (3D) piece of artwork from the projection surface 130.

The projection device 100 is configured to compensate for the detected adjustment by performing one or more image corrections upon detection of an adjustment event. The image corrections may include one or more projector settings of the projector 110 from which a calibration can be performed on the projector 110 and/or one or more image transformations (e.g., scaling, rotating, skewing, magnifying, correcting, warping, etc.) to transform at least a portion of the image. The projection device 100 is further configured to perform a depth scan, such as by using the camera device 108, to generate an updated model (e.g., a 3D model) of the projection region 128. Accordingly, the projection device 100 determines which image corrections to make on the projected image and/or the projector 110 settings.

The projection device 100 may be embodied as any type of computing device capable of projecting an image, or a video (i.e., a temporal sequence of images), onto a surface, such as a digital light processing (DLP) projector, a liquid crystal display (LCD) projector, a light emitting diode (LED) projector, a cathode ray tube (CRT) projector, a handheld projector, (i.e., a pico projector), and/or any type of video projection device capable of performing the functions described herein. It should be appreciated that, in some embodiments, the projection device 100 may be incorporated into another computing device, such as a smartphone, a tablet computer, a laptop computer, a notebook computer, a consumer electronic device, and/or any other type of mobile computing device. It should be further appreciated that, in some embodiments, an external computing device (not shown) (e.g., a smartphone, a laptop, etc.), may be connected to the projection device 100. In such embodiments, the external computing device connected to the projection device 100 may be configured to perform the depth scan and/or run an application that is capable of providing a user interface between the projection device 100 and the user for receiving input from and providing output to the user.

As shown in FIG. 1, the illustrative projection device 100 additionally includes a processor 102, an input/output (I/O) subsystem 104, a memory 106, a number of sensors 112, communication circuitry 118, one or more peripheral devices 120, and a data storage device 122. Of course, the projection device 100 may include other and/or additional and/or alternative components, such as those commonly found in a computing device (e.g., a display, various input/output devices, etc.), in other embodiments. Additionally, in some embodiments, one or more of the illustrative components may be incorporated in, or otherwise form a portion of, another component. For example, the memory 106, or portions thereof, may be incorporated in the processor 102 in some embodiments.

The processor 102 may be embodied as any type of processor capable of performing the functions described herein. For example, the processor 102 may be embodied as a single or multi-core processor(s), digital signal processor, microcontroller, or other processor or processing/controlling circuit. The memory 106 may be embodied as any type of volatile or non-volatile memory or data storage capable of performing the functions described herein. In operation, the memory 106 may store various data and software used during operation of the projection device 100 such as operating systems, applications, programs, libraries, and drivers.

The memory 106 is communicatively coupled to the processor 102 via the I/O subsystem 104, which may be embodied as circuitry and/or components to facilitate input/output operations with the processor 102, the memory 106, and other components of the projection device 100. For example, the I/O subsystem 104 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 104 may form a portion of a system-on-a-chip (SoC) and be incorporated, along with the processor 102, the memory 106, and other components of the projection device 100, on a single integrated circuit chip.

The camera device 108 may be embodied as any type of image capturing device that includes software, hardware, circuitry, or a combination thereof capable of enabling images to be captured, transmitted into signals, and processed to generate the model (e.g., a range model, a depth model, a 3D model, etc.) of a projection surface (e.g., the projection surface 130) within a field of view (FOV) 124 of the camera device 108. For example, in one such embodiment, the camera device 108 may be an Intel® RealSense™ 3D camera with depth-sensing technologies for generating a 3D model of the projection surface 130. The camera device 108 may be configured to use any image formatting technologies for capturing raw image data and storing the raw data as compressed and/or uncompressed still photograph files and/or video files using various digital format technologies and containers to a file on the projection device 100 (e.g., the data storage 122). It should be appreciated that, in some embodiments, the FOV 124 of the camera device 108 may be substantially the same as a FOV 126 of the projector 110, as shown in FIG. 1, such that the depth scan does not capture a FOV larger than the projection area 128 be projected on.

In some embodiments, the camera device 108 may include multiple image sensors (not shown), or an image sensor array, wherein each of the image sensors may be capable of capturing light and converting the captured light into electrical signals to be processed into images from which the 3D model of the projection surface 130 can be generated. In such embodiments, one or more of the image sensors may be embodied as or otherwise include one or more charge-coupled device (CCD) image sensors, complementary metal-oxide-semiconductor (CMOS) image sensors, and/or any type of image sensor capable of performing the functions described herein. It should be appreciated that, in some embodiments, the camera device 108 may include various other devices (e.g., an infrared (IR) projector, an IR sensor, etc.) such that the other devices can estimate depth values of objects in the FOV 124 by analyzing a light pattern projected on the projection surface 130 within the projection region 128.

The projector 110 may be embodied as any type of image projecting device that includes software, hardware, circuitry, or a combination thereof capable of projecting an image onto a surface within the FOV 126 of the projector 110. It should be appreciated that the projector 110 may use any type of technology for projecting the image, including transmissive or reflective technologies, such as DLP, LCD, LED, CRT, and/or any other type of projection technology. Accordingly, the projector 110 may include additional components not illustrated in FIG. 1 (e.g., a lens, lasers, etc.) for clarity of the description.

The illustrative sensors 112 include a motion sensor 114 and a light sensor 116. It should be appreciated that the sensors 112 may include additional and/or alternative sensors, such as acoustic sensors, thermal sensors, proximity sensors, location sensors, depth sensors (e.g., RGB-Depth sensors, phase detectors, image sensors, etc.), and/or other types of sensors. The motion sensor 114 may be embodied as any type of motion detecting sensor capable of detecting a motion in a vicinity of the projection device 100. For example, in some embodiments, the motion sensor 114 may include an optical sensor, a microwave sensor, and/or an acoustic sensor. It should be appreciated that the motion sensor 114 may use any type of motion technology to detect motion proximate to the projection device 100, such as passive IR, microwave, ultrasonic, radio wave, and/or software-based detection using images captured from the camera device 108. Additionally or alternatively, the motion sensor 112 may be embodied as any type of motion detecting sensor capable of detecting a motion of the projection device. In such embodiments, the motion sensor 112 may be an accelerometer, an inclinometer, a kinetic sensor or proximity sensor), an orientation sensor (e.g., a gyroscope), and/or any other type of hardware device that can sense or detect motion (rotational or translational) or position of the projection device 100. The light sensor 116 may be embodied as any type of photosensor, or photodetector, capable of sensing light and/or another electromagnetic energy.

The communication circuitry 118 may be embodied as any communication circuit, device, or collection thereof, capable of enabling communications between the projection device 100 and a remote computing device (not shown). The communication circuitry 118 may be configured to use any one or more communication technologies (e.g., wired or wireless communication technologies) and associated protocols (e.g., Ethernet, Bluetooth®, Wi-Fi®, WiMAX, USB, etc.) to effect such communication.

The peripheral devices 120 may include any number of input/output devices, interface devices, and/or other peripheral devices. For example, in some embodiments, the peripheral devices 120 may include a display, touch screen, graphics circuitry, keypad, keyboard, mouse, speaker system, and/or other input/output devices, interface devices, and/or peripheral devices. Additionally or alternatively, the peripheral devices 120 may include one or more ports, such as a USB port, for example, for connecting external peripheral devices to the projection device 100.

The data storage device 122 may be embodied as any type of device or devices configured for short-term or long-term storage of data such as, for example, memory devices and circuits, memory cards, hard disk drives, solid-state drives, or other data storage devices. In use, as described below, the data storage device 122 may store data of the projection region of the projector 110, such as the 3D model or other, similar data, as well as data related to the designated cut-out areas and action areas.

Figure 2:
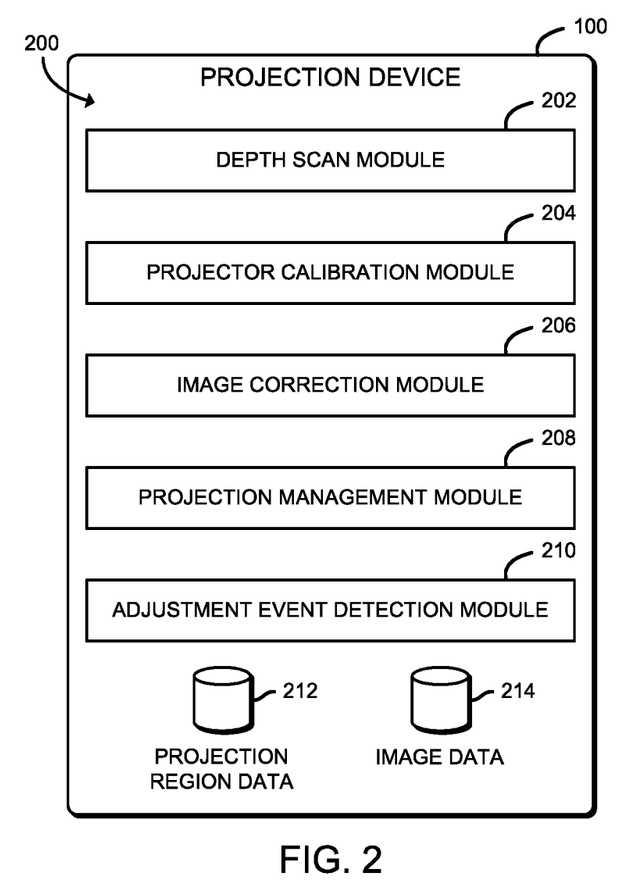
FIG. 2 is a simplified block diagram of at least one embodiment of an environment that may be established by the projection device of FIG. 1.

Referring now to FIG. 2, in an illustrative embodiment, the projection device 100 establishes an environment 200 during operation. The illustrative environment 200 includes a depth scan module 202, a projector calibration module 204, an image correction module 206, a projection management module 208, and an adjustment event detection module 210. Each of the modules, logic, and other components of the environment 300 may be embodied as hardware, software, firmware, or a combination thereof. For example, each of the modules, logic, and other components of the environment 200 may form a portion of, or otherwise be established by, the processor 102 or other hardware components of the projection device 100. As such, in some embodiments, one or more of the modules of the environment 200 may be embodied as a circuit or collection of electrical devices (e.g., a depth scan circuit, a projector calibration circuit, an image correction circuit, a projection management circuit, an adjustment event detection circuit, etc.). It should be appreciated that the projection device 100 may include other components, sub-components, modules, sub-modules, and devices commonly found in a projection device, which are not illustrated in FIG. 2 for clarity of the description.

Additionally, the illustrative environment includes projection region data 212 and image data 214, each of which may be accessed by one or more of the various modules and/or sub-modules of the projection device 100. The projection region data 212 may include any data indicative of the projection region, such as the 3D model of the projection region 128. The image data 214 may include any data indicative of the image to be projected (e.g., boundaries of the image, settings associated with the image, etc.).

Figure 6:
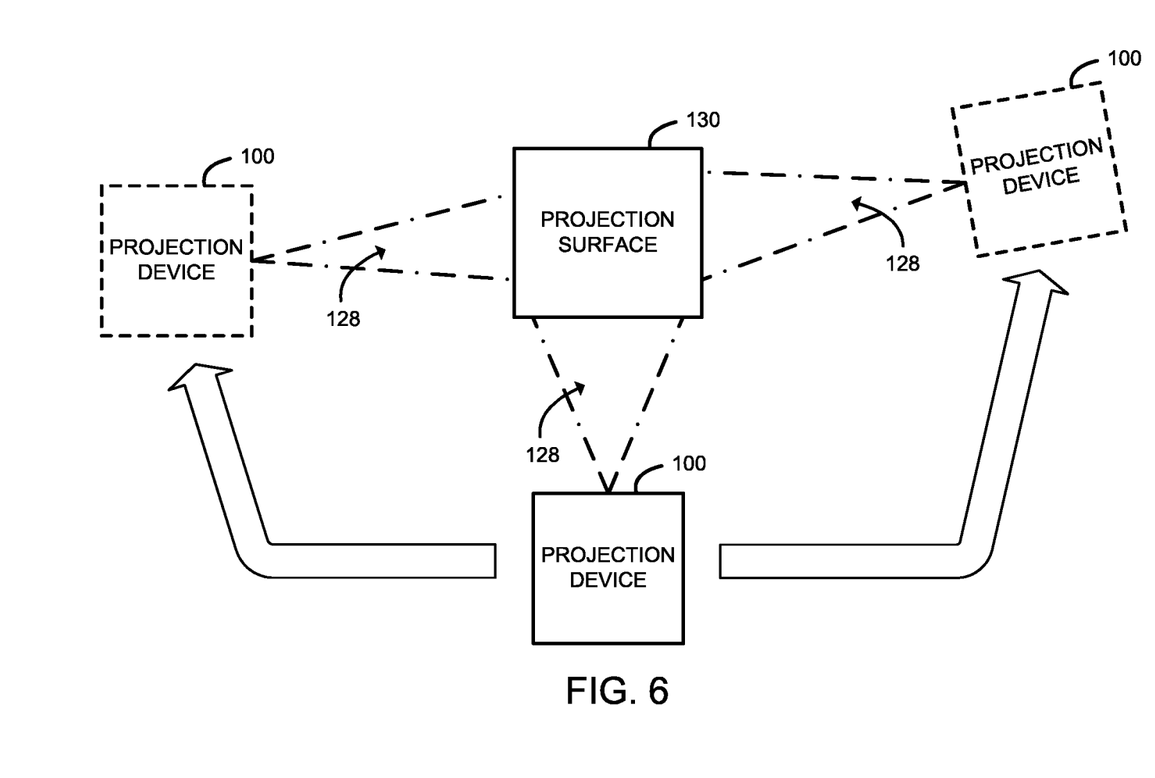
FIG. 6 is a simplified overhead view of at least one embodiment of the projection device of FIGS. 1 and 2 in different positions relative to the projection surface.

The depth scan module 202 is configured to perform a depth scan, such as by using the camera device 108. It should be appreciated that the depth scan module 202 may perform the depth scan using any depth scanning technology, or range imaging technology, known in the art capable of generating a model of the projection region 128, including projected light scanning (e.g., structured light 3D scanning, infrared projection scanning, etc.), time of flight (e.g., radio-frequency (RF) modulated light sources, pulsed-light, range-gated imagers, etc.), image stitching, etc. Accordingly, it should be further appreciated that the projector 110 may also be used, in some embodiments, to perform the depth scan, such as by using projected light patterns that can be captured by the camera device 108. In some embodiments, wherein a 3D image is to be displayed based on the projection region 128, the depth scan may be performed at various angles around the projection surface 130 to capture a 360° model of the projection surface 130. As shown in FIG. 6, in such embodiments, the projection region 128 may only be projected on a particular side of the projection surface at any given time, depending on the projection angle of the projector 110. Accordingly, to correct the image and/or calibrate the projector 110 to display a proportionally corrected image, the depth scan The projector calibration module 204 is configured to calibrate the projector 110 to accommodate for display of an image on the projection region 128. To do so, the projector calibration module 204 is configured to determine one or more projector settings. As previously described, the projector settings for the projector 110 may be determined based on the 3D model generated by the depth scan. The projector settings may include brightness, contrast, color, tint, sharpness, zoom, magnification, hue, saturation, lens shift, aspect ratio, resolution, and the like.

The image correction module 206 is configured to correct the image to be displayed on the projection region 128 based on one or more image transformations. As described previously, the image transformations that may be determined from the 3D model generated by the depth scan. The image transformations may include scaling, rotating, skewing, magnifying, warping, correcting (e.g., bit depth, keystoning, resolution, etc.), and/or any other type of image transformation that results in at least a portion of the image being corrected to proportionally display the image on the projection region 128.

The projection management module 208 is configured to project the corrected image onto the projection region 128 of the projection surface 130. Additionally or alternatively, the projection management module 208 may project one or more proportion lines (see the projection lines 504 of FIG. 5) within the projection region 128. It should be appreciated that, in some embodiments, the projection lines may be projected as one or more lines that provide a proportional frame of reference on the projection region 128, such as grid lines, vector lines, etc. Accordingly, the image correction module 206 may be additionally configured to transform the proportion lines similar to the image transformation (i.e., based on the image transformations).

The adjustment event detection module 210 is configured to monitor for an adjustment event. To do so, the adjustment event detection module 210 is configured to continuously, continually, or periodically perform a depth scan on the projection region of the projection surface 128 to generate an updated model of the projection surface 128. The adjustment event detection module 210 is further configured to determine whether an adjustment event was detected. Accordingly, in some embodiments, the adjustment event detection module 210 may be configured to enable one or more sensors of the projection device 100 (e.g., the sensors 112) to monitor for adjustment events using the sensors 112. To do so, the adjustment event detection module 210 is configured to compare a previous model of the projection region 128 generated by a previous depth scan and the updated model of the projection region 128 generated by the most recent depth scan to determine whether the projection device 100 was re-positioned and/or whether the projection region 128 was modified (e.g., the artist has removed or reshaped some of the medium forming the projection surface).

Figure 3:
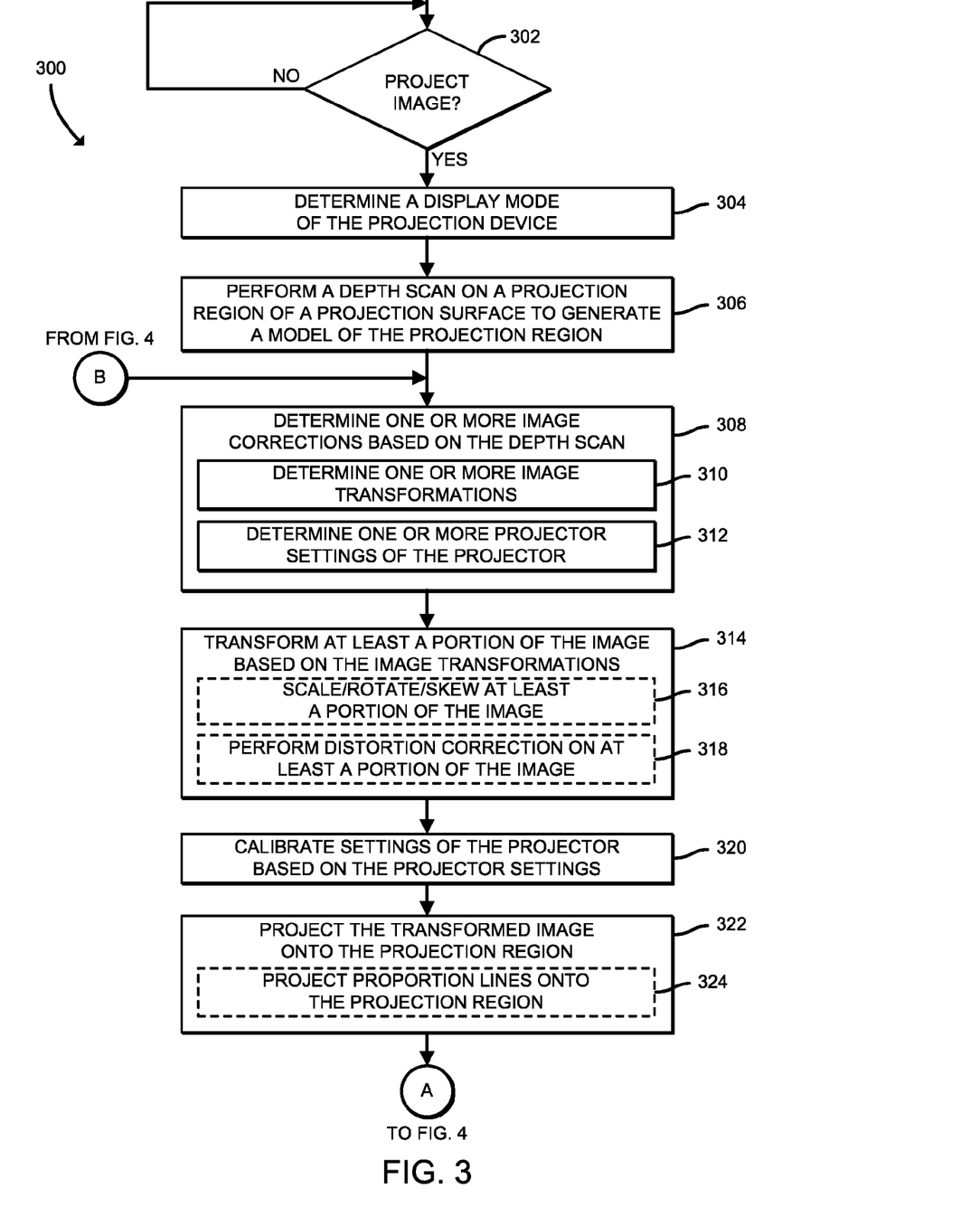
FIGS. 3 and 4 are a simplified flow diagram of at least one embodiment of a method for projecting a proportionally corrected image in response to detecting an adjustment event that may be executed by the projection device of FIGS. 1 and 2.
Figure 5:
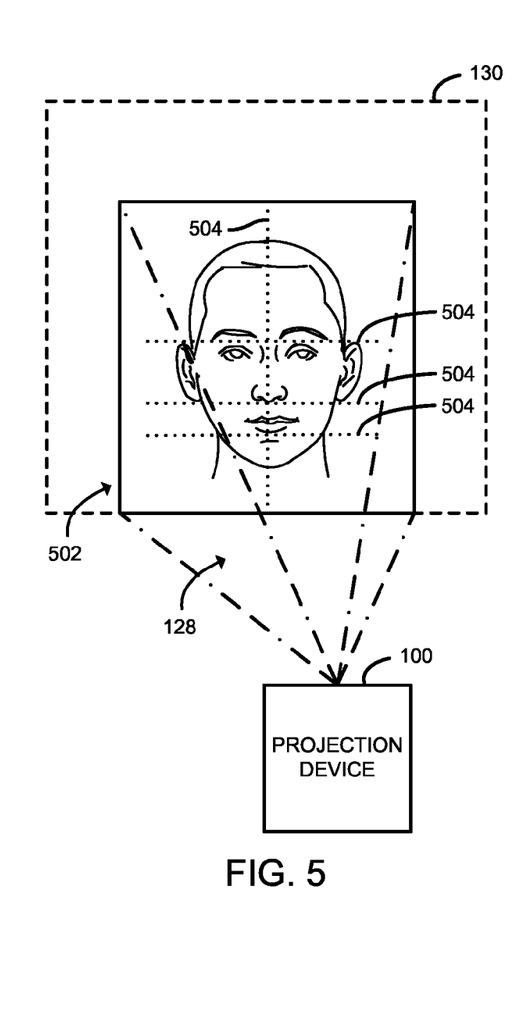
FIG. 5 is a simplified illustration of at least one embodiment of the image and proportion lines projected onto a projection region of a projection surface that may be projected by the projection device of FIGS. 1 and 2.

Referring now to FIG. 3, in use, the projection device 100 may execute a method 300 for initializing a projection region (e.g., the projection region 128) of a projection surface (e.g., the projection surface 130) on which to project an image (e.g., the image 502 of FIG. 5). The method 300 begins with block 302, in which the projection device 100 determines whether to project an image. In block 304, the projection device 100 determines a display mode of the projection device 100. The display mode may be indicative of any type of mode that can influence how the projection device 100 projects the image. For example, in some embodiments, the display modes may include a 2-dimensional (2D) display mode and a 3D display mode. In block 306, the projection device 100 performs a depth scan on the projection region 128 to generate a model (e.g., a range model, a depth model, a 3D model, etc.) of the projection region 128.

In block 308, the projection device 100 determines one or more image corrections based on the depth scan performed in block 306. To do so, in block 310, the projection device 100 determines one or more image transformations (e.g., scale, rotate, skew, warp, magnify, correct, etc.) that may be performed to transform at least a portion of the image. Additionally or alternatively, in block 312, the projection device 100 determines one or more projector settings (e.g., brightness, contrast, color, tint, sharpness, zoom, magnification, hue, saturation, lens shift, aspect ratio, resolution, etc.) of the projector 110 that may be used by the projection device 100 to calibrate the projector 110 for proportionally displaying the image onto the projection region 128.

In block 314, the projection device transforms at least a portion of the image based on the image transformations determined in block 308. Accordingly, in some embodiments, in block 316, the projection device 100 may scale, rotate, skew, and/or warp the image prior to the image being displayed. Additionally or alternatively, in some embodiments, in block 318, the projection device 100 may perform a distortion correction, such as keystone correction, on at least a portion of the image.

In block 320, the projection device 100 calibrates the projector 110, based on the projector settings determined in block 312, to proportionally displaying the projected image on the projection region 128. In block 322, the projection device 100 projects the image transformed in block 314 onto the projection region 128. Additionally, in some embodiments, the projection device 100 may project one or more proportion lines (e.g., the proportion lines 504 of FIG. 5) onto the projection region 128. It should be appreciated that, in some embodiments, only the proportion lines may be displayed on the projection region 128.

Figure 4:
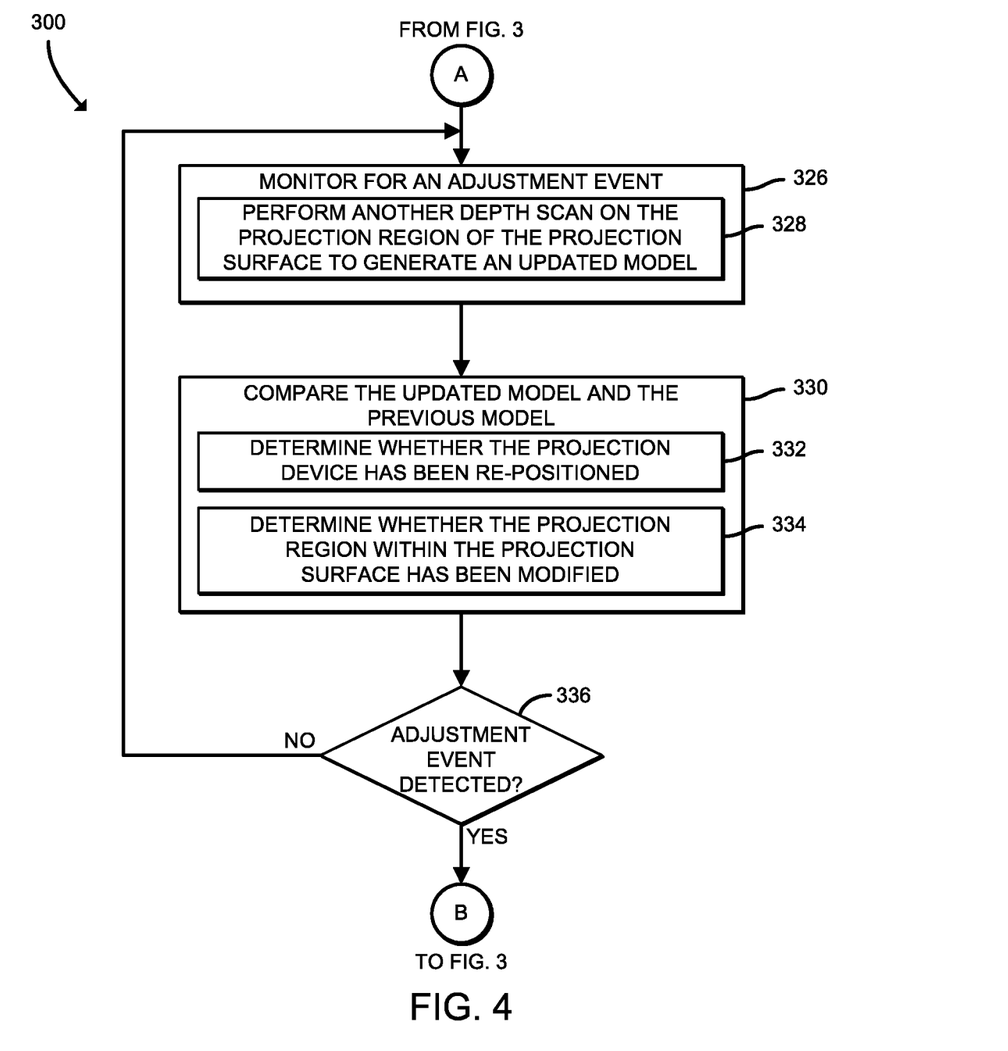

From block 322, the method 300 advances to block 326, which is shown in FIG. 4. In block 326, the projection device 100 monitors for an adjustment event. To do so, in block 328, the projection device 100 performs another depth scan on the projection region 128 to generate an updated model of the projection region 128. In block 330, the projection device 100 compares the updated model of the projection region 128 generated in block 328 against a previous model of the projection region 128. In other words, the projection device 100 compares the most recently generated model (i.e., before the updated model generated in block 328) to the updated model generated in block 328.

Accordingly, in block 332, the projection device 100 can determine whether the projection device 100 has been re-positioned relative to the projection surface 130. As shown in FIG. 6, such re-positioning may result in the image being projected at various angles (e.g., along the horizontal and/or vertical axes) and/or from different perspectives. It should be appreciated that, while the projection surface 130 shown in FIG. 6 is a 3D projection surface, the projection surface 128 may be a 2D projection surface. Accordingly, in such embodiments, the projection device 100 may be re-positioned along the 2D projection surface, rather than around the 3D projection surface.

Referring again to FIG. 3, in block 334, the projection device 100 additionally or alternatively determines whether the projection region 128 within the projection surface 130 has been modified. For example, if the projection surface 130 is made of a particular medium (e.g., ice, clay, stone, metal, wood, etc.) that an artist is using to form (e.g., model, carve, mold, construct, etc.) into a work of art (e.g., a sculpture), the projection surface 130 may be manipulated, or otherwise modified, while the artist works the projection region 128 into the work of art.

From block 330, the method 300 advances to block 336 to determine whether the adjustment event was detected. If the adjustment event was not detected, the method 300 returns to block 326 to continue monitoring for the adjustment event. Otherwise, if the adjustment event was detected, the method 300 returns to block 308 to determine one or more image corrections based on the updated model of the projection region 128 generated in block 328.

EXAMPLES

Illustrative examples of the technologies disclosed herein are provided below. An embodiment of the technologies may include any one or more, and any combination of, the examples described below.

Example 1 includes a projection device to project a proportionally corrected image, the projection device comprising a camera device to perform a depth scan on a projection region of a projection surface in a field of view of a projector of the projection device; a projector to project an image onto the projection region; a depth scan module to perform a first depth scan on the projection region to generate a first model of the projection region, wherein the first depth scan is performed by the camera device; an image correction module to (i) determine one or more image corrections as a function of the first model of the projection region and (ii) transform the image based on the one or more image corrections to generate a first updated image; a projection management module to project the first updated image to the projection region via the projector; and an adjustment event detection module to monitor the projection region to detect an adjustment event, wherein to detect the adjustment event comprises to detect a change of the projection region relative to the projection device, wherein the image correction module is further to generate, in response to a detection of the adjustment event, a second updated image based on the detected change of the projection region.

Example 2 includes the subject matter of Example 1, and wherein to monitor the projection region comprises to perform, using the camera, a second depth scan on the projection region to generate a second model of the projection region from which a present depth value for each portion of the projection region can be determined.

Example 3 includes the subject matter of any of Examples 1 and 2, and wherein to generate the second updated image comprises to (i) determine one or more updated image corrections as a function of the second model and (ii) transform the image based on the updated image corrections to generate the second updated image; and further comprising to project, by the projector, the second updated image to the projection region.

Example 4 includes the subject matter of any of Examples 1-3, and wherein the detected change of the projection region relative to the projection device comprises a detected change in an angle of the projection device relative to the projection region.

Example 5 includes the subject matter of any of Examples 1-4, and further including to determine a previous depth value for each portion of the projection region; compare the present depth value for each portion of the projection region to a corresponding most recent depth value for each portion of the projection region; and determine that an adjustment event was detected in response to a determination that at least one of the present depth values does not match a corresponding one of the previous depth values.

Example 6 includes the subject matter of any of Examples 1-5, and further including a projector calibration module to (i) determine one or more projector settings for the image to be projected based on a result of the first depth scan and the projection region and (ii) calibrate the projection device based on the one or more projector settings.

Example 7 includes the subject matter of any of Examples 1-6, and wherein to calibrate the projector settings comprises to calibrate the projector settings based on a stitched 360° model based on the first depth scan and the projection region in response to a determination that the image is to be projected in a 3-dimensional display mode.

Example 8 includes the subject matter of any of Examples 1-7, and wherein to calibrate the projector settings comprises to calibrate the projector settings based on the image, the first depth scan, and the projection region in response to a determination that the image is to be projected in a 3-dimensional display mode.

Example 9 includes the subject matter of any of Examples 1-8, and wherein the projector calibration module is further to (ii) re-calibrate the one or more projector settings for the image to be projected based on a result of the other depth scan and the projection region and (ii) project, by the projector, the re-transformed image to the projection region.

Example 10 includes the subject matter of any of Examples 1-9, and wherein the detected change of the projection region relative to the projection device comprises a detected change on the projection surface within the projection region.

Example 11 includes the subject matter of any of Examples 1-10, and wherein to transform the image comprises to transform the image by at least one of scaling the image, rotating the image, and skewing the image.

Example 12 includes the subject matter of any of Examples 1-11, and wherein to transform the image comprises to at least one of perform a distortion correction on the image and correct for a keystone effect on the image.

Example 13 includes the subject matter of any of Examples 1-12, and wherein to project the transformed image to the projection region further comprises to project one or more proportion lines onto the projection region.

Example 14 includes the subject matter of any of Examples 1-13, and wherein to determine whether the adjustment event was detected comprises to determine whether the projection device is in a position relative to the projection region different from a previous position at which the previous depth scan was performed.

Example 15 includes a method for projecting a proportionally corrected image, the method comprising performing, using a camera of the projection device, a first depth scan on a projection region of a projection surface in a field of view of a projector of the projection device to generate a first model of the projection region, wherein the projection region defines an area of the projection surface on which the projector is to project an image; determining, by the projection device, one or more image corrections as a function of the first model of the projection region; transforming, by the projection device, the image based on the image corrections to generate a first updated image; projecting, by the projector of the projection device, the first updated image to the projection region; monitoring, by the projection device, the projection region to detect an adjustment event, wherein detecting the adjustment event comprises detecting a change of the projection region relative to the projection device; and generating, by the projection device and in response to detecting the adjustment event, a second updated image based on the detected change of the projection region.

Example 16 includes the subject matter of Example 15, and wherein monitoring the projection region comprises performing, using the camera, a second depth scan on the projection region to generate a second model of the projection region from which a present depth value for each portion of the projection region can be determined.

Example 17 includes the subject matter of any of Examples 15 and 16, and wherein generating the second updated image comprises (i) determining, by the projection device, one or more updated image corrections as a function of the second model and (ii) transforming, by the projection device, the image based on the updated image corrections to generate the second updated image; and further comprising projecting, by the projector, the second updated image to the projection region.

Example 18 includes the subject matter of any of Examples 15-17, and further including determining a previous depth value for each portion of the projection region as a function of the first model; comparing the present depth value for each portion of the projection region to a corresponding most recent depth value for each portion of the projection region; and determining that an adjustment event was detected in response to a determination that at least one of the present depth values does not match a corresponding one of the previous depth values.

Example 19 includes the subject matter of any of Examples 15-18, and further including determining one or more projector settings for the image to be projected based on a result of the first depth scan and the projection region; and calibrating the projection device based on the one or more projector settings.

Example 20 includes the subject matter of any of Examples 15-19, and wherein calibrating the projector settings comprises calibrating the projector settings based on a stitched 360° model based on the first depth scan and the projection region in response to a determination that the image is to be projected in a 3-dimensional display mode.

Example 21 includes the subject matter of any of Examples 15-20, and wherein calibrating the projector settings comprises calibrating the projector settings based on the image, the first depth scan, and the projection region in response to a determination that the image is to be projected in a 3-dimensional display mode.

Example 22 includes the subject matter of any of Examples 15-21, and further including re-calibrating, by the projection device, the one or more projector settings for the image to be projected based on a result of the second depth scan and the projection region; and projecting, by the projector, the re-transformed image to the projection region.

Example 23 includes the subject matter of any of Examples 15-22, and wherein detecting the detected change of the projection region relative to the projection device comprises a detected change in an angle of the projection device relative to the projection region.

Example 24 includes the subject matter of any of Examples 15-23, and wherein detecting the detected change of the projection region relative to the projection device comprises a detected change on the projection surface within the projection region.

Example 25 includes the subject matter of any of Examples 15-24, and wherein transforming the image comprises transforming the image by at least one of scaling the image, rotating the image, and skewing the image.

Example 26 includes the subject matter of any of Examples 15-25, and wherein transforming the image comprises performing a distortion correction on the image.

Example 27 includes the subject matter of any of Examples 15-26, and wherein transforming the image comprises correcting for a keystone effect on the image.

Example 28 includes the subject matter of any of Examples 15-27, and wherein projecting the transformed image to the projection region further comprises projecting one or more proportion lines onto the projection region.

Example 29 includes the subject matter of any of Examples 15-28, and wherein determining whether the adjustment event was detected comprises determining whether the projection device is in a position relative to the projection region different from a previous position at which the previous depth scan was performed.

Example 30 includes a projection device comprising a processor; and a memory having stored therein a plurality of instructions that when executed by the processor cause the projection device to perform the method of any of Examples 15-29.

Example 31 includes one or more machine readable storage media comprising a plurality of instructions stored thereon that in response to being executed result in a projection device performing the method of any of Examples 15-29.

Example 32 includes a projection device for projecting a proportionally corrected image, the projection device comprising means for performing, using a camera of the projection device, a first depth scan on a projection region of a projection surface in a field of view of a projector of the projection device to generate a first model of the projection region, wherein the projection region defines an area of the projection surface on which the projector is to project an image; means for determining one or more image corrections as a function of the first model of the projection region; means for transforming the image based on the image corrections to generate a first updated image; means for projecting, by the projector of the projection device, the first updated image to the projection region; means for monitoring the projection region to detect an adjustment event, wherein detecting the adjustment event comprises detecting a change of the projection region relative to the projection device; and means for generating, and in response to detecting the adjustment event, a second updated image based on the detected change of the projection region.

Example 33 includes the subject matter of Example 32, and wherein the means for monitoring the projection region comprises means for performing, using the camera, a second depth scan on the projection region to generate a second model of the projection region from which a present depth value for each portion of the projection region can be determined.

Example 34 includes the subject matter of any of Examples 32 and 33, and wherein the means for generating the second updated image comprises means for (i) determining one or more updated image corrections as a function of the second model and (ii) transforming the image based on the updated image corrections to generate the second updated image; and further comprising means for projecting, by the projector, the second updated image to the projection region.

Example 35 includes the subject matter of any of Examples 32-34, and further including means for (i) determining a previous depth value for each portion of the projection region as a function of the first model, (ii) comparing the present depth value for each portion of the projection region to a corresponding most recent depth value for each portion of the projection region, and (iii) determining that an adjustment event was detected in response to a determination that at least one of the present depth values does not match a corresponding one of the previous depth values.

Example 36 includes the subject matter of any of Examples 32-35, and further including means for determining one or more projector settings for the image to be projected based on a result of the first depth scan and the projection region; and means for calibrating the projection device based on the one or more projector settings.

Example 37 includes the subject matter of any of Examples 32-36, and wherein the means for calibrating the projector settings comprises means for calibrating the projector settings based on a stitched 360° model based on the first depth scan and the projection region in response to a determination that the image is to be projected in a 3-dimensional display mode.

Example 38 includes the subject matter of any of Examples 32-37, and wherein the means for calibrating the projector settings comprises means for calibrating the projector settings based on the image, the first depth scan, and the projection region in response to a determination that the image is to be projected in a 3-dimensional display mode.

Example 39 includes the subject matter of any of Examples 32-38, and further including means for re-calibrating the one or more projector settings for the image to be projected based on a result of the second depth scan and the projection region; and means for projecting, by the projector, the re-transformed image to the projection region.

Example 40 includes the subject matter of any of Examples 32-39, and wherein detecting the detected change of the projection region relative to the projection device comprises a detected change in an angle of the projection device relative to the projection region.

Example 41 includes the subject matter of any of Examples 32-40, and wherein detecting the detected change of the projection region relative to the projection device comprises a detected change on the projection surface within the projection region.

Example 42 includes the subject matter of any of Examples 32-41, and wherein the means for transforming the image comprises means for transforming the image by at least one of scaling the image, rotating the image, and skewing the image.

Example 43 includes the subject matter of any of Examples 32-42, and wherein the means for transforming the image comprises means for performing a distortion correction on the image.

Example 44 includes the subject matter of any of Examples 32-43, and wherein the means for transforming the image comprises means for correcting for a keystone effect on the image.

Example 45 includes the subject matter of any of Examples 32-44, and wherein the means for projecting the transformed image to the projection region further comprises means for projecting one or more proportion lines onto the projection region.

Example 46 includes the subject matter of any of Examples 32-45, and wherein the means for determining whether the adjustment event was detected comprises means for determining whether the projection device is in a position relative to the projection region different from a previous position at which the previous depth scan was performed.

The invention claimed is:

1. A projection device to project a proportionally corrected image, the projection device comprising:
a camera device to perform a depth scan on a projection region of a projection surface in a field of view of a projector of the projection device;
a projector to project an image onto the projection region;
a depth scan module to perform a first depth scan on the projection region to generate a first model of the projection region, wherein the first depth scan is performed by the camera device;
an image correction module to (i) determine one or more image corrections as a function of the first model of the projection region and (ii) transform the image based on the one or more image corrections to generate a first updated image;
a projection management module to project the first updated image to the projection region via the projector; and
an adjustment event detection module to monitor the projection region to detect an adjustment event, wherein to detect the adjustment event comprises to detect a change of the projection region relative to the projection device,
wherein the image correction module is further to generate, in response to a detection of the adjustment event, a second updated image based on the detected change of the projection region.

2. The projection device of claim 1, wherein to monitor the projection region comprises to perform, using the camera, a second depth scan on the projection region to generate a second model of the projection region from which a present depth value for each portion of the projection region can be determined.

3. The projection device of claim 2, wherein to generate the second updated image comprises to (i) determine one or more updated image corrections as a function of the second model and (ii) transform the image based on the updated image corrections to generate the second updated image; and
further comprising to project, by the projector, the second updated image to the projection region.

4. The projection device of claim 2, wherein the detected change of the projection region relative to the projection device comprises a detected change in an angle of the projection device relative to the projection region.

5. The projection device of claim 2, further comprising to:
determine a previous depth value for each portion of the projection region;
compare the present depth value for each portion of the projection region to a corresponding most recent depth value for each portion of the projection region; and
determine that an adjustment event was detected in response to a determination that at least one of the present depth values does not match a corresponding one of the previous depth values.

6. The projection device of claim 5, further comprising a projector calibration module to (i) determine one or more projector settings for the image to be projected based on a result of the first depth scan and the projection region and (ii) calibrate the projection device based on the one or more projector settings.

7. The projection device of claim 6, wherein the projector calibration module is further to (ii) re-calibrate the one or more projector settings for the image to be projected based on a result of the other depth scan and the projection region and (ii) project, by the projector, the re-transformed image to the projection region.

8. The projection device of claim 1, wherein the detected change of the projection region relative to the projection device comprises a detected change on the projection surface within the projection region.

9. The projection device of claim 1, wherein to project the transformed image to the projection region further comprises to project one or more proportion lines onto the projection region.

10. The projection device of claim 1, wherein to determine whether the adjustment event was detected comprises to determine whether the projection device is in a position relative to the projection region different from a previous position at which the previous depth scan was performed.

11. One or more non-transitory, computer-readable storage media comprising a plurality of instructions stored thereon that in response to being executed cause a projection device to:
- perform, using a camera of the projection device, a first depth scan on a projection region of a projection surface in a field of view of a projector of the projection device to generate a first model of the projection region, wherein the projection region defines an area of the projection surface on which the projector is to project an image;
- determine one or more image corrections as a function of the first model of the projection region;
- transform the image based on the image corrections to generate a first updated image;
- project, by the projector of the projection device, the first updated image to the projection region;
- monitor the projection region to detect an adjustment event, wherein detecting the adjustment event comprises detecting a change of the projection region relative to the projection device; and
- generate, in response to detecting the adjustment event, a second updated image based on the detected change of the projection region.

12. The one or more non-transitory, computer-readable storage media of claim 11, wherein to monitor the projection region comprises to perform, using the camera, a second depth scan on the projection region to generate a second model of the projection region from which a present depth value for each portion of the projection region can be determined.

13. The one or more non-transitory, computer-readable storage media of claim 12,
- wherein to generate the second updated image comprises to (i) determine one or more updated image corrections as a function of the second model and (ii) transform the image based on the updated image corrections to generate the second updated image; and
- further comprising a plurality of instructions that in response to being executed cause the projection device to project, by the projector, the second updated image to the projection region.

14. The one or more non-transitory, computer-readable storage media of claim 12, further comprising a plurality of instructions that in response to being executed cause the projection device to:
- determine a previous depth value for each portion of the projection region as a function of the first model;
- compare the present depth value for each portion of the projection region to a corresponding most recent depth value for each portion of the projection region; and
- determine that an adjustment event was detected in response to a determination that at least one of the present depth values does not match a corresponding one of the previous depth values.

15. The one or more non-transitory, computer-readable storage media of claim 12, further comprising a plurality of instructions that in response to being executed cause the projection device to:
- determine one or more projector settings for the image to be projected based on a result of the first depth scan and the projection region; and
- calibrate the projection device based on the one or more projector settings.

16. The one or more non-transitory, computer-readable storage media of claim 15, further comprising a plurality of instructions that in response to being executed cause the projection device to:
- re-calibrate the one or more projector settings for the image to be projected based on a result of the second depth scan and the projection region; and
- project, by the projector, the re-transformed image to the projection region.

17. The one or more non-transitory, computer-readable storage media of claim 15, wherein to detect the detected change of the projection region relative to the projection device comprises to detect a detected change in an angle of the projection device relative to the projection region.

18. The one or more non-transitory, computer-readable storage media of claim 15, wherein to detect the detected change of the projection region relative to the projection device comprises to detect a detected change on the projection surface within the projection region.

19. The one or more non-transitory, computer-readable storage media of claim 15, wherein to project the transformed image to the projection region further comprises to project one or more proportion lines onto the projection region.

20. The one or more non-transitory, computer-readable storage media of claim 15, wherein to determine whether the adjustment event was detected comprises to determine whether the projection device is in a position relative to the projection region different from a previous position at which the previous depth scan was performed.

21. A method for projecting a proportionally corrected image, the method comprising:
- performing, using a camera of the projection device, a first depth scan on a projection region of a projection surface in a field of view of a projector of the projection device to generate a first model of the projection region, wherein the projection region defines an area of the projection surface on which the projector is to project an image;
- determining, by the projection device, one or more image corrections as a function of the first model of the projection region;
- transforming, by the projection device, the image based on the image corrections to generate a first updated image;
- projecting, by the projector of the projection device, the first updated image to the projection region;
- monitoring, by the projection device, the projection region to detect an adjustment event, wherein detecting the adjustment event comprises detecting a change of the projection region relative to the projection device; and
- generating, by the projection device and in response to detecting the adjustment event, a second updated image based on the detected change of the projection region.

22. The method of claim 21, wherein monitoring the projection region comprises performing, using the camera, a second depth scan on the projection region to generate a second model of the projection region from which a present depth value for each portion of the projection region can be determined.

23. The method of claim 22,
- wherein generating the second updated image comprises (i) determining, by the projection device, one or more updated image corrections as a function of the second model and (ii) transforming, by the projection device, the image based on the updated image corrections to generate the second updated image; and further comprising projecting, by the projector, the second updated image to the projection region.

24. The method of claim 22, further comprising:

determining a previous depth value for each portion of the projection region as a function of the first model;

comparing the present depth value for each portion of the projection region to a corresponding most recent depth value for each portion of the projection region; and determining that an adjustment event was detected in response to a determination that at least one of the present depth values does not match a corresponding one of the previous depth values.

25. The method of claim 22, further comprising:

determining one or more projector settings for the image to be projected based on a result of the first depth scan and the projection region; and calibrating the projection device based on the one or more projector settings.

* * * * *